June 27, 1933.     G. S. MAYNARD     1,916,008
PIN FASTENER
Filed June 19, 1931
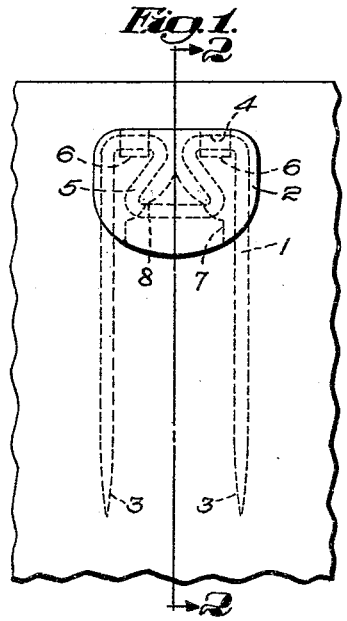
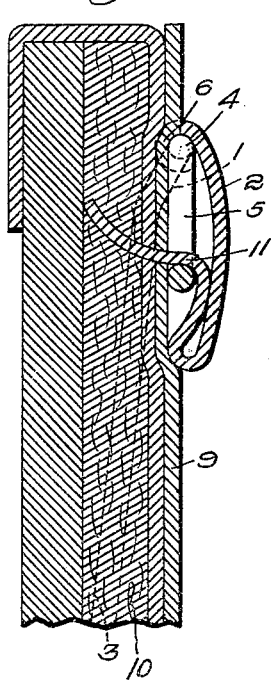
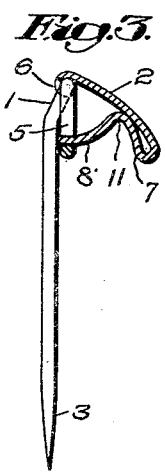
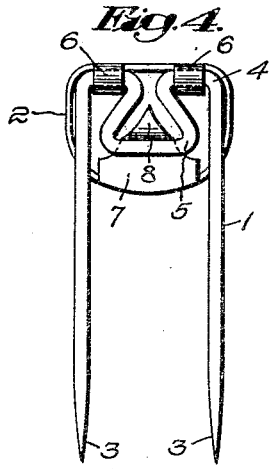
Inventor:
George S. Maynard
by Emery, Booth, Varney & Townsend
Attys Patented June 27, 1933

1,916,008

UNITED STATES PATENT OFFICE

GEORGE S. MAYNARD, OF NEWTONVILLE, MASSACHUSETTS, ASSIGNOR TO UNITED-CARR FASTENER CORPORATION, OF CAMBRIDGE, MASSACHUSETTS, A CORPORATION OF MASSACHUSETTS

PIN FASTENER

Application filed June 19, 1931. Serial No. 545,427.

My invention aims to provide improvements in pin fasteners particulary, though not exclusively useful in connection with the attachment of slip covers to upholstery.

In the drawing which illustrates a preferred embodiment of my invention:

Figure 1 is an elevation view of a portion of an installation showing my pin fastener as it appears when securing a slip cover in position;

Fig. 2 is an enlarged section taken on the line 2—2 of Figure 1;

Fig. 3 is a vertical section through the pin fastener showing the hinged plate in unlocked position; and Fig. 4 is a rear elevation of the pin fastener showing the plate in locked position.

The pin fastener illustrated by the drawing is an improvement over the well known type of "campaign" button fastener which has been used to a large extent for securing slip covers to upholstery installations. That type of fastener has been objectionable because it would pull loose or, if provided with means to prevent pulling loose, it could be removed only with difficulty and in many cases resulted in injury to finger nails and/or to the material to which it was attached.

My improved fastener is easy to attach and detach and is securely locked in place in a very simple and effective manner without injury to the material during attachment or detachment.

The particular device selected for illustration comprises an attaching part 1 and a plate part 2. The attaching part 1 is made preferably of wire and has two sharp pointed parallel legs 3 connected by a portion 4 having a triangular-shaped loop 5 formed therein (Fig. 4) and extending between and in the same direction as the legs 3. The plate part 2 has hinges 6 (Figs. 3 and 4) engaging the connecting portion 4 at opposite sides of the loop 5, so that the plate part may swing relative to the attaching portion for purposes hereinafter described. The plate part 2 has locking means in the form of a sharp pointed yieldable finger 7 extending from the lower end of the plate part upwardly and underlying the plate part, as shown in Figs. 2 and 4. This finger 7 then extends rearwardly from the plate part 2 to provide a generally curved sharp pointed prong portion 8.

To attach the fastener to an upholstered structure such as that shown in Fig. 2, the plate is swung into an unlocked position substantially at right angles to the legs 3. Then with the plate part 2 grasped between the thumb and the first and second fingers the sharp pointed legs 4 may be easily forced through the slip cover 9 and into embedded relation with the upholstery 10. Thereafter the plate part 2 is pressed toward the slip cover 9 and the prong portion 8 of the yieldable finger 7 is forced through the slip cover 9 and into the upholstery, as shown in Fig. 2, thereby locking the fastener against accidental withdrawal. During the latter part of the attaching operation the prong portion 8 passes into the triangular-shaped loop 5 and engages over the upper edge of the lower flat portion of the loop (Fig. 4). The finger 7 yields so that when the plate part is pressed against the slip cover the lower portion of the loop 5 will enter into the depression 11 formed in the finger. Thus the plate 2 is securely locked in position and cannot accidentally be brushed into unlocking position.

When the fastener is attached as above described the slip cover 9 is held securely in position and the prong portion 8 prevents the legs 3 from pulling out of the upholstery 10 when lateral stress is exerted upon the slip cover 9. To remove the fastener it is merely necessary to lift the lower edge of the plate part 2, thereby pulling the prong portion 8 free from the installation. Thereafter the plate part 2 may be grasped and the pin removed by exerting an upward pull thereon.

My invention is durable, simple in construction and is arranged to provide a very desirable device for simple and efficient use. It is made of two pieces, one of which (the plate piece) is formed from a single piece of sheet metal and the hinge portions and locking prong are so arranged that they are concealed by a neat and preferably imperforate front portion.

While I have illustrated and described a preferred embodiment of my invention, I do not wish to be limited thereby, because the scope of my invention is best defined by the following claims.

I claim:

1. In a pin fastener, a double pronged pin having a cross bar connecting its prongs, said cross bar provided with a loop, a cap hinged to said cross bar intermediate said pin prongs and loop and provided with a prong extending into said loop, said cap provided also with a snap fastening element engageable with said loop to detachably lock said cap and its prong in fixed relation to said pin.

2. In a pin fastener, a double pronged pin having a cross bar extending between the prongs of the pin and provided with a loop, said loop deflected from the plane of said prongs, a cap hinged to said cross bar between said prongs and loop and having a prong passing through the loop and engageable with the material to which the pin fastener is applied, said cap provided with a snap fastening element for engagement with said loop to lock said cap and its prong in fixed relation to said pin and material, the deflected arrangement of said loop facilitating insertion of the pin fastener in the material.

In testimony whereof, I have signed my name to this specification.

GEORGE S. MAYNARD.